Nov. 10, 1925.
J. G. EVERSTAM
1,560,770
ADJUSTABLE SELF CLOSING VALVE
Filed Dec. 15, 1924 2 Sheets-Sheet 1
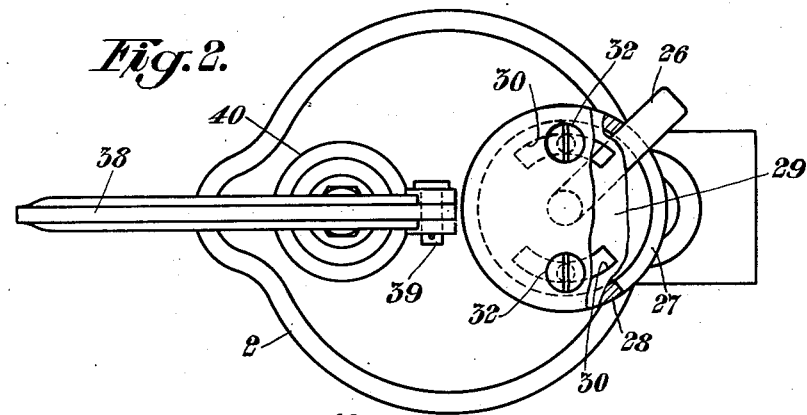
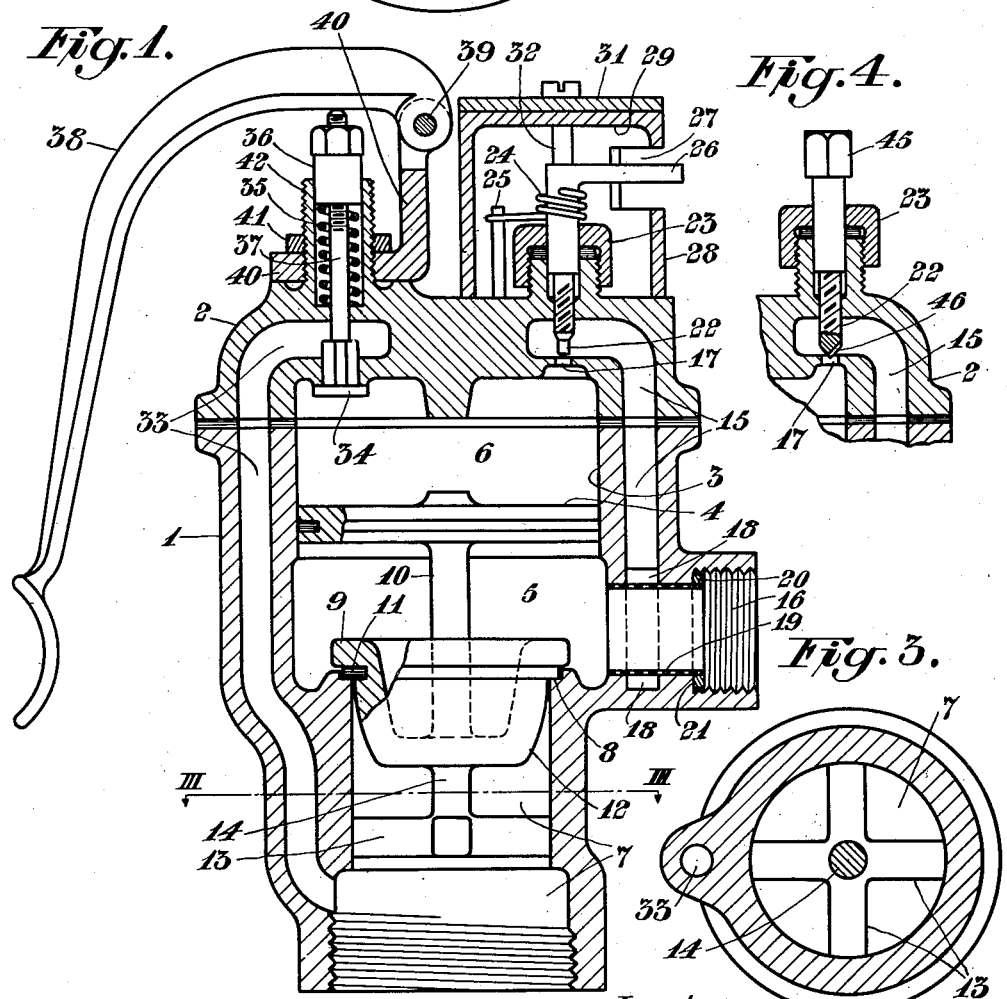
Inventor:
Johan Gunner Everstam
By George Bayard Jones
atty.

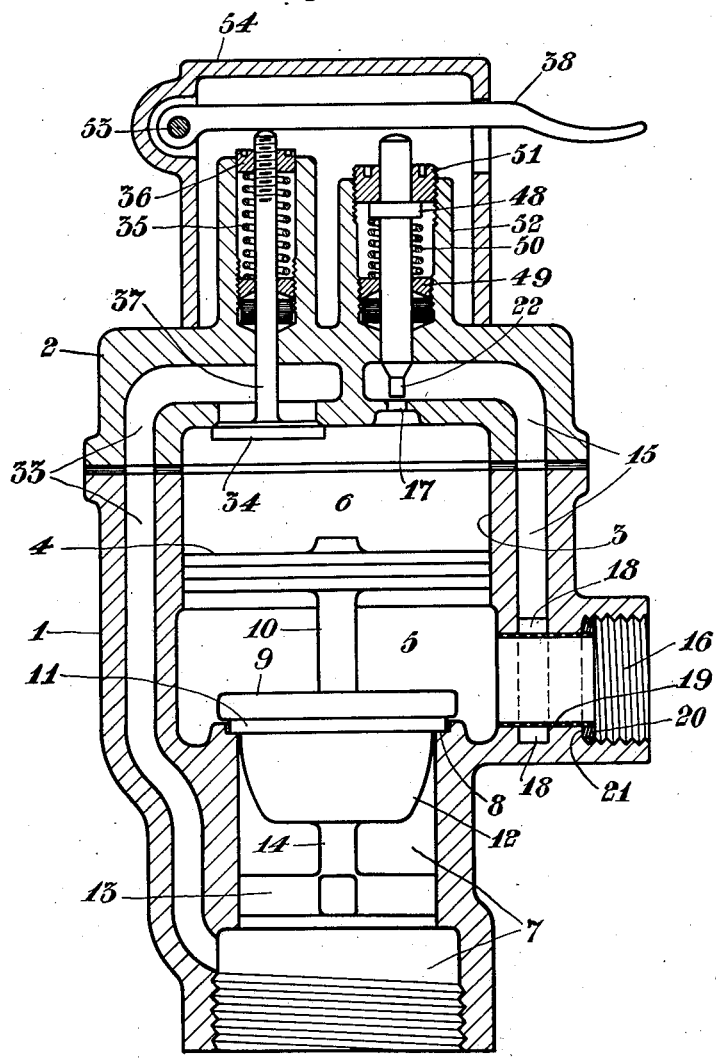

Patented Nov. 10, 1925.

1,560,770

UNITED STATES PATENT OFFICE.

JOHAN GUNNAR EVERSTAM, OF SUNDSVALL, SWEDEN.

ADJUSTABLE SELF-CLOSING VALVE.

Application filed December 15, 1924. Serial No. 755,917.

*To all whom it may concern:*

Be it known that I, JOHAN GUNNAR EVERSTAM, a subject of the King of Sweden, residing at Sundsvall, Sweden, have invented a new and useful Improvement in Adjustable Self-Closing Valves, of which the following is a specification.

The present invention relates to self-closing valves which are adapted to remain open during a certain length of time after each actuation, and during such time to allow a certain quantity of liquid or gas to pass through the valve, after which the valve closes automatically. Such valves comprise in the main a casing member having an inlet and an outlet, a valve body controlling the direct flow of fluid from the inlet to the outlet and connected with a movable partition, such as a diaphragm or a piston, separating two chambers in said casing one of which is in direct communication with the inlet, and the other of which communicates with the inlet through a restricted passage and with the outlet through a normally closed valve controlled passage. The valve in the last mentioned passage, which may be termed an auxiliary valve, is adapted to be manually operated from the outside of the casing member, and when so operated it allows the fluid in the second chamber to escape to the outlet, with the result that the pressure of the fluid in the first mentioned chamber which is in direct communication with the inlet, will act on the movable partition and displace the same, thus opening the valve body and establishing direct communication between the inlet and the outlet. The auxiliary valve is adapted to close, under spring actuation or the like, as soon as it is released, and the length of time during which the main valve body will afterwards remain open is dependent upon the length of time required for the fluid to flow from the inlet through the restricted passage into said second chamber and equalize the pressure on both sides of the movable partition, when the main valve body will close actuated, for instance, by its own weight. It will thus be understood that the proper operation of such valves is dependent to a very large degree upon the said restricted passage always offering the same resistance to the flow of fluid through the same, and it is therefore very important that the said passage is kept free from foul matter which might clog the same.

Now, the present invention relates to certain improvements in valves of the type above described with a view to make such valves more safe and reliable in operation. One of the features of the invention consists in that a sieve is provided in the restricted passage from the inlet to the second chamber. Said sieve may preferably be located in the inlet in such manner that it covers the port of the said passage in said inlet, and the sieve will thus be flushed by the water flowing through the inlet to the outlet when the valve is open. A further feature of the invention consists in that a needle valve which is adjustable from the outside of the casing for controlling a constriction in the restricted passage, is capable of such play that it may be moved into said constriction for thus removing any foul matter which may have collected in the same, means such as a spring being preferably provided for returning said needle valve to its adjusted normal position after each such actuation. Other features of the invention will be explained in the following description and defined in the claims.

The accompanying drawings illustrate by way of example a few embodiments of the invention. Fig. 1 shows a vertical section of a flush valve according to the invention. Fig. 2 shows a top plan view of the valve and Fig. 3 shows a horizontal section on the line III—III in Fig. 1. Fig. 4 shows a fractional view of a slightly modified construction. Fig. 5 shows a vertical section of a third embodiment of a flush valve.

Referring to Figs. 1, 2, and 3, 1 denotes a body portion which is provided with a cap 2, said body portion and cap forming together the casing member of the valve. The interior of the body portion 1 is formed as a cylinder 3 in which a piston 4 is movable, said piston dividing said cylinder into two chambers 5 and 6 and forming a movable partition between these chambers. The chamber 5 below the piston 4 is in direct communication with the inlet 16 which is formed as a nipple on the body portion 1 for connection with a water pipe. The body portion is also provided with an outlet 7 the upper rim of which forms a seat 8 for the main valve body 9 which is connected through a stem 10 with the piston 4. The valve 9 is provided with a packing 11 which serves to modify the impact of the valve body 9 against the seat 8 when the valve closes and also to insure tightness between the valve body and its seat. As illustrated in the drawing the valve body 9 has approximately the shape of a cup, having a lower portion 12 which, in the closed position of the valve reaches into the outlet 7 and is of conical or slightly rounded shape, for the purpose that when the valve body returns from its raised or open position to its closed position the said curved or conical lower portion 12 shall gradually decrease the area of flow to nil immediately before the valve body stops against its seat 8, for in this manner gradually to decrease the velocity of flow of the fluid between said portion 12 of the valve body and the upper rim or seat 8 of the outlet 7, so that the valve body will close with the least possible shock.

A guide member consisting of a cross or spider 13 the outer ends of the arms of which are adapted to slide against the inner cylindrical wall of the outlet 7, is connected with the valve body 9 through a short stem 14, said spider serving to guide the valve body during its movement. The pressure of the water flowing through the outlet 7 when the valve body 9 is in open position, acting on the arms of said spider also aids the valve body to close.

A passage 15 is formed in the body portion 1 and in the cap 2, said passage leading from the inlet 16 to the chamber 6 and communicating with said chamber through a small aperture 17 which forms a constriction in said passage. In the embodiment illustrated, the port of said passage 15 opening into the inlet 16 is formed as an annular groove 18 in the wall of said inlet. Said port or groove is covered by a sieve 19 in the shape of a cylindrical sleeve which lines the inner cylindrical surface of the inlet 16 and is retained in position therein by a ring 20 secured to the end of said sieve and bearing against a seat 21 in said inlet.

A needle valve 22 is screw-threaded into the cap 2 and passes through a packing box having a cap 23, said valve being in alignment with the axis of the aperture or constriction 17. Said needle valve is adjusted to normally stand at a certain distance from said constriction, such that it allows the fluid to flow from the passage 15 through said constriction into the chamber 6 with a certain speed corresponding to the desired length of time for filling said chamber. The needle valve is actuated by a coil spring 24 one end of which is attached to the needle valve and the other end of which is attached to a fixed member, such as a stud 25 attached to the cap 2. Said coil spring 24 tends to turn the needle valve 22 in such direction that it is moved away from the constriction 17, such turning of the needle valve 22 being prevented by a lateral arm 26 secured to the needle valve bearing against the end wall of a slot 27 in a cap 28. The top portion 29 of said cap is provided with two curved slots 30 and is covered by a disk 31. Screws 32 traverse said disk 31 and the slots 30 in the top portion 29 of the cap 28 and are screw-threaded into the cap 2 thus securing said cap 28 to said cap 2. By loosening the screws 32 slightly the cap 28, which is coaxial with the needle valve 22, may be turned for adjustment after which it may again be secured by tightening the screws 32. The spring 24 maintaining the arm 26 bearing against the end wall of the slot 27 in said cap 28, such turning and adjustment of the cap 28 will effect a corresponding turning of the needle valve 22 and thus adjustment of the same towards or away from the constriction 17. The slot 27 has such peripheral extension that the arm 26 may be turned through approximately 90° before it strikes the other end wall of said slot, the pitch of the threaded portion of the needle valve being such that at such turning of the arm 26 the end of the needle valve 22 will be moved down into the aperture or constriction 17 and remove all dirt which may have collected in the same. When the arm 26 is released, the spring 24 returns the same and the needle valve to the adjusted normal position.

The chamber 6 communicates with the outlet 7 through a passage 33 formed in the cap 2 and the body portion 1, said communication being controlled by a valve 34 which is normally maintained closed by a coil spring 35 acting on a nut 36 on the stem 37 of said valve. The said valve may be opened by actuating a lever 38 which bears against the end of the valve stem 37 and is pivoted at 39 in a standard 40 which is secured to the cap 2 by means of a nut 41 screwed onto an externally threaded sleeve 42 projecting from the cap 2 and surrounding the coil spring 35.

The operation of the valve is as follows: When the lever 38 is operated the auxiliary valve 34 is depressed against the action of the spring 35 and the chamber 6 is thus placed in communication with the passage 33. The fluid in the chamber 6 may thus escape to the outlet 7, and the pressure in said chamber being relieved, the pressure of the fluid in the chamber 5 will force the piston 4 upwards in the cylinder and force the fluid in the chamber 6 out through the passage 33. Simultaneously the main valve body 9 is raised from its seat, and direct communication is thus established between the inlet 16 and the outlet 7. When the lever 38 is released the spring 35 closes the auxiliary valve 34. The fluid flowing through the passage 15 and the constriction 17 into the chamber 6 now gradually fills said chamber and increases the pressure in the same, until said pressure becomes equal to and afterwards slightly in excess of the pressure below the piston 4 in the chamber 5, said piston and the valve body 9 thus moving downwards and finally shutting off the direct communication between the inlet 16 and the outlet 7 when the valve body 9 reaches its seat 8. The sieve 19 prevents rust and other particles in the water from entering the passage 15, such particles collecting on the sieve from which they will be washed away on the next operation of the valve and follow the fluid to the outlet 7. Certain substances dissolved or otherwise contained in the water may pass said sieve, however, and become deposited in the constriction 17, but such deposits will easily be removed by turning the arm 26 in the manner above described, and it is thus assured that the chamber 6 shall always require the same length of time to be filled after each actuation of the auxiliary valve 34, and thus that the same quantity of fluid shall always pass through the valve upon each such actuation.

Fig. 4 shows a slightly modified form of the needle valve. The needle valve 22 is provided with a head 45 by means of which it may be turned towards and away from the constriction 17, the valve being provided with a conical end which may thus be moved into said constriction for removing dirt from the same. A groove 46 is cut in said conical end which groove provides the desired area of flow past the point of the valve.

In the embodiment illustrated in Fig. 5 the construction of the needle valve 22 differs from that described in connection with Fig. 1 in that the needle valve is provided with a collar 48 between which and a packing ring 49 a spring 50 is inserted which tends to move the needle valve away from the constriction 17. The needle valve 22 is movable endwise and is maintained by the spring 50 bearing with its collar 48 against a ring 51 screwed into the upper end of the sleeve or packing box 52. By adjusting said ring 51 the needle valve 22 may thus be adjusted towards or away from the constriction 17. The lever 38 by means of which the auxiliary valve 34 may be opened, is located over the upper end of the needle valve 22, so that when said lever 38 is depressed for opening said auxiliary valve 34 it will simultaneously depress the needle valve 22 and force the end of the same into the constriction 17 for removing deposits from the same. The lever 38 is journalled at 53 in a cap or cover 54 which may be secured to the cap 2 in any suitable manner. In other respects this construction is similar to that above described with reference to Fig. 1, and similar reference numerals are used in the drawings to indicate similar parts.

It will be understood that although the embodiments above described and illustrated in the drawings have proved to be very suitable in practice, the invention is not limited to these preferred constructions, as various changes and modifications will readily suggest themselves to those skilled in the art, without departing from the principle and scope of the invention as defined in the accompanying claims.

I claim:

1. A flush valve having a casing member, an inlet to said casing, an outlet from said casing, a valve body controlling the direct flow of fluid from the inlet to the outlet, two chambers in said casing, a movable partition separating said chambers and connected with said valve body, one of said chambers being in direct communication with said inlet, a passage for the supply of liquid from said inlet to the other of said chambers, a constriction in said passage, a needle valve adjustable from the outside of said casing for controlling said constriction, said needle valve being movable into said constriction, a spring tending to retract said needle valve from said constriction, a stop for said needle valve, and a normally closed valve controlled passage for the discharge of fluid from said second chamber to the outlet.

2. A flush valve having a casing member, an inlet to said casing, an outlet from said casing, a valve body controlling the direct flow of fluid from the inlet to the outlet, two chambers in said casing, a movable partition separating said chambers and connected with said valve body, one of said chambers being in direct communication with said inlet, a passage for the supply of liquid from said inlet to the other of said chambers, a constriction in said passage, a needle valve adjustable from the outside of said casing for controlling said constriction, said needle valve being movable into said constriction, a spring tending to retract said needle valve from said constriction, a stop for said needle valve, a sieve in said passage, and a normally closed valve controlled passage for the discharge of fluid from said second chamber to the outlet.

3. A flush valve having a casing member, an inlet to said casing, an outlet from said casing, a valve body controlling the direct flow of fluid from the inlet to the outlet, two chambers in said casing, a movable partition separating said chambers and connected with said valve body, one of said chambers being in direct communication with said inlet, a passage for the supply of liquid from said inlet to the other of said chambers, a constriction in said passage, a needle valve adjustable from the outside of said casing for controlling said constriction, said needle valve being movable into said constriction, a spring tending to retract said needle valve from said constriction, a stop for said needle valve, a passage for the discharge of fluid from said second chamber to the outlet, a valve normally closing said discharge passage, and a lever adapted to simultaneously actuate said last-mentioned valve to open the same and said needle valve to move the same into said constriction.

4. A flush valve having a casing member, an inlet to said casing, an outlet from said casing, a valve body controlling the direct flow of fluid from the inlet to the outlet, two chambers in said casing, a movable partition separating said chambers and connected with said valve body, one of said chambers being in direct communication with said inlet, a passage for the supply of fluid from said inlet to the other of said chambers, a constriction in said passage, a needle valve adjustable from the outside of said casing for controlling said constriction, said needle valve being normally in a position entirely outside but in register with said constriction and being movable into said constriction, a spring tending to retract said needle valve from said constriction, a stop for said needle valve, and a normally closed valve controlled passage for the discharge of fluid from said second chamber to the outlet.

5. A flush valve having a casing member, an inlet to said casing, an outlet from said casing, a valve body controlling the direct flow of liquid from the inlet to the outlet, two chambers in said casing, a movable partition separating said chambers and connected with said valve body, one of said chambers being in direct communication with said inlet, a passage for the supply of fluid from said inlet to the other of said chambers, a constriction in said passage, a needle valve adjustable from the outside of said casing for controlling said constriction, said needle valve being normally in a position entirely outside but in register with said constriction and being movable into said constriction, a spring tending to retract said needle valve from said constriction, an adjustable stop for said needle valve, and a normally closed valve controlled passage for the discharge of fluid from said second chamber to the outlet.

6. A flush valve having a casing member, an inlet to said casing, an outlet from said casing, a valve body controlling the direct flow of fluid from the inlet to the outlet, two chambers in said casing, a movable partition separating said chambers and connected with said valve body, one of said chambers being in direct communication with said inlet, a passage for the supply of fluid from said inlet to the other of said chambers, a constriction in said passage, a needle valve adjustable from the outside of said casing for controlling said constriction, said needle valve being normally in a position entirely outside but in register with said constriction and being movable into said constriction, a spring tending to retract said needle valve from said constriction, a stop for said needle valve, a passage for the discharge of fluid from said second chamber to the outlet, a valve normally closing said discharge passage, and a lever adapted to simultaneously actuate said last mentioned valve to open the same and said needle valve to move the same into said constriction.

7. A flush valve having a casing member, an inlet to said casing, an outlet from said casing, a valve body controlling the direct flow of fluid from the inlet to the outlet, two chambers in said casing, a movable partition separating said chambers and connected with said valve body, one of said chambers being in direct communication with said inlet, a passage for the supply of fluid from said inlet to the other of said chambers, a constriction in said passage, a needle valve adjustable from the outside of said casing for controlling said constriction, said needle valve being normally in a position entirely outside but in register with said constriction and being movable into said constriction, a spring tending to retract said needle valve from said constriction, an adjustable stop for said needle valve, a passage for the discharge of fluid from said second chamber to the outlet, a valve normally closing said discharge passage, and a lever adapted to simultaneously actuate said last-mentioned valve to open the same and said needle valve to move the same into said constriction.

JOHAN GUNNAR EVERSTAM.